United States Patent
Mastro et al.

(10) Patent No.: US 12,276,339 B2
(45) Date of Patent: Apr. 15, 2025

(54) CARBON FACE SEAL

(71) Applicant: RTX Corporation, Farmington, CT (US)

(72) Inventors: Jacob Peter Mastro, Lyme, CT (US); Andrew V. Schwendenmann, Hampden, MA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/578,421

(22) PCT Filed: Jan. 20, 2023

(86) PCT No.: PCT/US2023/011227
§ 371 (c)(1),
(2) Date: Jan. 11, 2024

(87) PCT Pub. No.: WO2023/141263
PCT Pub. Date: Jul. 27, 2023

(65) Prior Publication Data
US 2024/0295269 A1    Sep. 5, 2024

Related U.S. Application Data

(60) Provisional application No. 63/301,691, filed on Jan. 21, 2022.

(51) Int. Cl.
*F16J 15/34* (2006.01)

(52) U.S. Cl.
CPC ....... *F16J 15/3496* (2013.01); *F16J 15/3452* (2013.01); *F16J 15/3472* (2013.01)

(58) Field of Classification Search
CPC ... F16J 15/3496; F16J 15/3452; F16J 15/3472
See application file for complete search history.

(56) References Cited

U.S. PATENT DOCUMENTS

| | | | |
|---|---|---|---|
| 3,419,363 A | 12/1968 | Sliney | |
| 3,647,227 A | 3/1972 | Lojkutz et al. | |
| 3,758,179 A | 9/1973 | Smith | |
| 3,764,150 A * | 10/1973 | Newkirk | F16J 15/36 277/398 |

(Continued)

FOREIGN PATENT DOCUMENTS

| | | |
|---|---|---|
| EP | 3819528 A1 | 5/2021 |
| GB | 2453231 A | 4/2009 |

*Primary Examiner* — Vishal A Patel
(74) *Attorney, Agent, or Firm* — Bachman & LaPointe, P.C.

(57) ABSTRACT

An apparatus has: a first member (120); a shaft (40; 50) rotatable relative to the first member about an axis; and a seal system (100). The seal system has a seal carrier (150) having: an axially-extending wall (156) having an inner diameter (ID) surface (160); and a radially-extending wall (154) having a first surface (158). A seal (102) is carried by the first member and has: an outer diameter (OD) surface (206); and a seal face (106). A seat (104) is carried by the shaft and has a seat face (108) in sliding sealing engagement with the seal face. One or more springs (132) bias the seal carrier relative to the first member so as to bias the seal face against the seat face. A key (240; 280; 300; 338) spans an interface between the seal carrier and the seal.

21 Claims, 6 Drawing Sheets

(56) References Cited

U.S. PATENT DOCUMENTS

| | | | |
|---|---|---|---|
| 3,948,533 A | | 4/1976 | Novosad |
| 4,175,755 A | * | 11/1979 | Geary .................. F16J 15/441 |
| | | | 277/422 |
| 4,688,807 A | | 8/1987 | Warner |
| 4,728,448 A | | 3/1988 | Sliney |
| 4,746,268 A | | 5/1988 | Sugimoto et al. |
| 4,768,923 A | * | 9/1988 | Baker .................. F04D 29/628 |
| | | | 415/230 |
| 5,174,584 A | | 12/1992 | Lahrman |
| 5,188,377 A | * | 2/1993 | Drumm ............... F16J 15/3488 |
| | | | 277/398 |
| 5,217,232 A | | 6/1993 | Makhobey |
| 5,577,739 A | * | 11/1996 | Ciotola ............... F16J 15/3488 |
| | | | 277/380 |
| 6,007,069 A | | 12/1999 | Sadowski |
| 9,995,397 B2 | | 6/2018 | Miller |
| 10,385,713 B2 | | 8/2019 | Walker et al. |
| 2004/0201176 A1 | | 10/2004 | Bjornson |
| 2008/0308425 A1 | | 12/2008 | Mittendorf et al. |
| 2010/0254840 A1 | * | 10/2010 | Nedlich ............... F04D 29/126 |
| | | | 277/358 |
| 2014/0091535 A1 | | 4/2014 | Cusack et al. |
| 2019/0154156 A1 | | 5/2019 | Sakakura et al. |
| 2020/0166140 A1 | | 5/2020 | Richie et al. |
| 2021/0254719 A1 | | 8/2021 | Stoyanov et al. |
| 2021/0332889 A1 | | 10/2021 | Nasman et al. |
| 2023/0235678 A1 | | 7/2023 | Schwendenmann et al. |

* cited by examiner

CARBON FACE SEAL

CROSS-REFERENCE TO RELATED APPLICATION

Benefit is claimed of U.S. Patent Application No. 63/301,691, filed Jan. 21, 2022, and entitled "Carbon Face Seal", the disclosure of which is incorporated by reference herein in its entirety as if set forth at length.

BACKGROUND

The disclosure relates to gas turbine engines. More particularly, the disclosure relates to carbon seal systems.

Carbon seals are commonly used to seal between relatively rotating components in gas turbine engines (used in propulsion and power applications and broadly inclusive of turbojets, turboprops, turbofans, turboshafts, industrial gas turbines, and the like). These include shaft seals (i.e., where the sealing surfaces of seal and seat face radially (e.g., within 1.0° or essentially 0°) and extend axially) and face seals (i.e., where the sealing surfaces face axially (e.g., within 1.0° or essentially 0°) and extend radially).

In typical face seal situations, the annular carbon seal is axially spring biased into engagement with an annular seat (typically metallic such as a steel). Typical bias springs are bellows springs, coil springs (multiple circumferentially-distributed springs), or wave springs. The spring(s) act axially between a seal housing (seal support) and a seal carrier (carbon carrier) carrying the seal. An example seal carrier is a full annulus metal component carrying the seal and intervening between the seal and the spring. For example, a carrier may have: an outer sidewall surrounding a portion of the seal in interference fit; and a radial flange engaged by the spring (e.g., to which a bellows spring is welded). The sprung mass of such a seal includes the mass of the carbon ring, the carrier, and effectively half of the spring(s).

The seal may be a single-piece full annulus carbon member or may be segmented (formed by an end-to-end circumferential array of segments in arch bound relation via the carrier interference fit). For either type, the interference fit is advantageously tight enough to maintain the seal seated in the carrier so that the seal does not shift circumferentially or axially (local or overall) relative to the carrier. Alternative proposed seals use an adhesive film (e.g., epoxy) to reduce or eliminate the required interference fit. At the microscale retaining the seal seated in the carrier is important because if the seal rotates or moves axially it can break or liberate resulting in seal failure. On a microscale if the retention method does not retain the seal it can move after assembly so that the flatness of the sealing face no longer meets the strict requirements, thereby making the seal ineffective.

Often, the carbon seal is on non-rotating static structure and the seat rotates with one of the engine shafts. The sliding engagement causes frictional heating. The heat must be dissipated. With a rotating seat, it is common to use oil cooling. Generally, oil cooled carbon seals are divided into two categories: "dry face" seals wherein the oil passes through passageways in the seat without encountering the interface between seal face and seat face; and "wet face" seals wherein the oil passes through the seat to the interface so that the oil that flows through the seat cools the seat but then lubricates the interface to further reduce heat generation.

For both wet face and dry face seals, the oil may be delivered through a nozzle and slung radially outward by the rotating component and collected in a radially outwardly closed and inwardly open collection channel from which the passageways extend further radially outward.

SUMMARY

One aspect of the disclosure involves an apparatus comprising: a first member; a shaft rotatable relative to the first member about an axis; and a seal system. The seal system has a seal carrier having: an axially-extending wall having an inner diameter (ID) surface; and a radially-extending wall having a first surface. A seal is carried by the first member and has: an outer diameter (OD) surface; and a seal face. A seat is carried by the shaft and has a seat face in sliding sealing engagement with the seal face. One or more springs bias the seal carrier relative to the first member so as to bias the seal face against the seat face. A key spans an interface between the seal carrier and the seal.

In a further embodiment of any of the foregoing embodiments, additionally and/or alternatively, the key spans the seal carrier ID surface and the seal OD surface.

In a further embodiment of any of the foregoing embodiments, additionally and/or alternatively, the radial interference fit provides a compressive stress in the seal of 10 MPa to 150 MPa.

In a further embodiment of any of the foregoing embodiments, additionally and/or alternatively, the key comprises an epoxy.

In a further embodiment of any of the foregoing embodiments, additionally and/or alternatively, the key has: a first portion in a hole in the seal carrier axially-extending wall; and a second portion in an axially-extending channel formed by respective grooves in the seal carrier axially-extending wall ID surface and seal OD surface.

In a further embodiment of any of the foregoing embodiments, additionally and/or alternatively, the key has: a third portion in a circumferentially-extending channel formed by respective grooves in the seal carrier and seal and joining the first portion to the second portion.

In a further embodiment of any of the foregoing embodiments, additionally and/or alternatively, the key has: a first portion in a hole in the seal carrier axially-extending wall; a second portion in a hole in the seal carrier axially-extending wall; and a third portion in a circumferentially-extending channel formed by respective grooves in the seal carrier and seal and joining the first portion to the second portion.

In a further embodiment of any of the foregoing embodiments, additionally and/or alternatively, the key is metallic.

In a further embodiment of any of the foregoing embodiments, additionally and/or alternatively, the key comprises a metallic pin.

In a further embodiment of any of the foregoing embodiments, additionally and/or alternatively, the metallic pin (or other key) has a shaft having: an outboard portion in a hole in the seal carrier; an inboard portion in a hole in the seal; and a lateral protrusion backlocked against the seal carrier to resist outward displacement.

In a further embodiment of any of the foregoing embodiments, additionally and/or alternatively, the hole in the seal carrier extends through the axially-extending wall.

In a further embodiment of any of the foregoing embodiments, additionally and/or alternatively, the hole in the seal is a blind hole.

In a further embodiment of any of the foregoing embodiments, additionally and/or alternatively, the key is one of a plurality of keys spanning the seal carrier inner diameter (ID) surface and seal outer diameter (OD) surface.

In a further embodiment of any of the foregoing embodiments, additionally and/or alternatively, the plurality of keys are in a circumferential array (e.g., evenly spaced).

In a further embodiment of any of the foregoing embodiments, additionally and/or alternatively, the seal is a carbon seal.

In a further embodiment of any of the foregoing embodiments, additionally and/or alternatively, the seat is steel.

In a further embodiment of any of the foregoing embodiments, additionally and/or alternatively, the seal is a single piece.

In a further embodiment of any of the foregoing embodiments, additionally and/or alternatively, the apparatus is a gas turbine engine.

In a further embodiment of any of the foregoing embodiments, additionally and/or alternatively, a method for manufacturing the apparatus comprises: thermal interference fitting the seal to the carrier; and installing the key or forming the key in situ.

In a further embodiment of any of the foregoing embodiments, additionally and/or alternatively, the forming the key in situ comprises curing epoxy.

In a further embodiment of any of the foregoing embodiments, additionally and/or alternatively, the forming the key in situ is after the thermal interference fitting.

In a further embodiment of any of the foregoing embodiments, additionally and/or alternatively, the forming the key in situ further comprises injecting the epoxy before the curing.

In a further embodiment of any of the foregoing embodiments, additionally and/or alternatively, the injecting the epoxy (or other key-forming material) passes the epoxy (or other key-forming material) through an inlet and an outlet, at least one of the inlet and the outlet being in the seal carrier.

In a further embodiment of any of the foregoing embodiments, additionally and/or alternatively, the injecting the epoxy (or other key-forming material) passes the epoxy (or other key-forming material) through an inlet leg from the inlet, an outlet leg to the outlet, and an intermediate leg circumferentially offsetting the outlet leg from the inlet leg.

In a further embodiment of any of the foregoing embodiments, additionally and/or alternatively, the injecting the epoxy passes the epoxy (or other key-forming material) through a leg formed by mating grooves in the seal and seal carrier.

In a further embodiment of any of the foregoing embodiments, additionally and/or alternatively, the installing the key comprises driving the key through the seal carrier into the seal.

In a further embodiment of any of the foregoing embodiments, additionally and/or alternatively, the driving the key through the seal carrier into the seal is radially inward through the seal carrier axially-extending wall to project from the inner diameter (ID) surface.

In a further embodiment of any of the foregoing embodiments, additionally and/or alternatively, the key has a projection; and the driving the key through the seal carrier compresses the projection and then allows the projection to expand to backlock against reverse movement.

In a further embodiment of any of the foregoing embodiments, additionally and/or alternatively, the method further comprises: line drilling through the carrier and seal to form a through hole in the carrier and a blind hole in the seal, the driving being through the through-hole into the blind hole.

In a further embodiment of any of the foregoing embodiments, additionally and/or alternatively, the thermal interference fitting comprises: heating the seal carrier to a temperature of 90° C. to 340° C.; and inserting the seal into the seal carrier.

In a further embodiment of any of the foregoing embodiments, additionally and/or alternatively, cooling of the seal carrier leaves a radial interference fit with a compressive stress in the seal of at least 10 MPa.

Another aspect of the disclosure involves an apparatus comprising: a first member; a shaft rotatable relative to the first member about an axis; and a seal system. The seal system has a seal carrier having: an axially-extending wall having an inner diameter (ID) surface; and a radially-extending wall having a first surface. A seal is carried by the first member and has: an outer diameter (OD) surface; and a seal face. A seat is carried by the shaft and has a seat face in sliding sealing engagement with the seal face. One or more springs bias the seal carrier relative to the first member so as to bias the seal face against the seat face. A means interlocks the seal carrier and the seal to prevent relative movement.

In a further embodiment of any of the foregoing embodiments, the relative movement may be rotation and/or translation.

In a further embodiment of any of the foregoing embodiments, additionally and/or alternatively, the means may be separately formed from the seal and the carrier.

In a further embodiment of any of the foregoing embodiments, additionally and/or alternatively, the means may have one or more attributes of the key described above or further below.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

To supplement the retention provided by the interference fit, additional keying may retain the seal to the carrier axially and/or circumferentially. As discussed below, the keying may take the form of a plurality of circumferentially distributed keys differently/separately formed from and spanning junctions between the carrier and the seal. In some embodiments, the keys may be pre-formed and then inserted (e.g., metallic pins). In some embodiments, the keys may be formed in situ (e.g., epoxy or other flowable key-forming material injected into a seal-carrier preassembly and allowed to cure and/or otherwise harden).

The key installation or formation may be after the thermal interference fitting. This may be particularly relevant to in situ formation where the material that forms the key may not be able to withstand the temperatures of the thermal interference fitting process.

Figure 1:
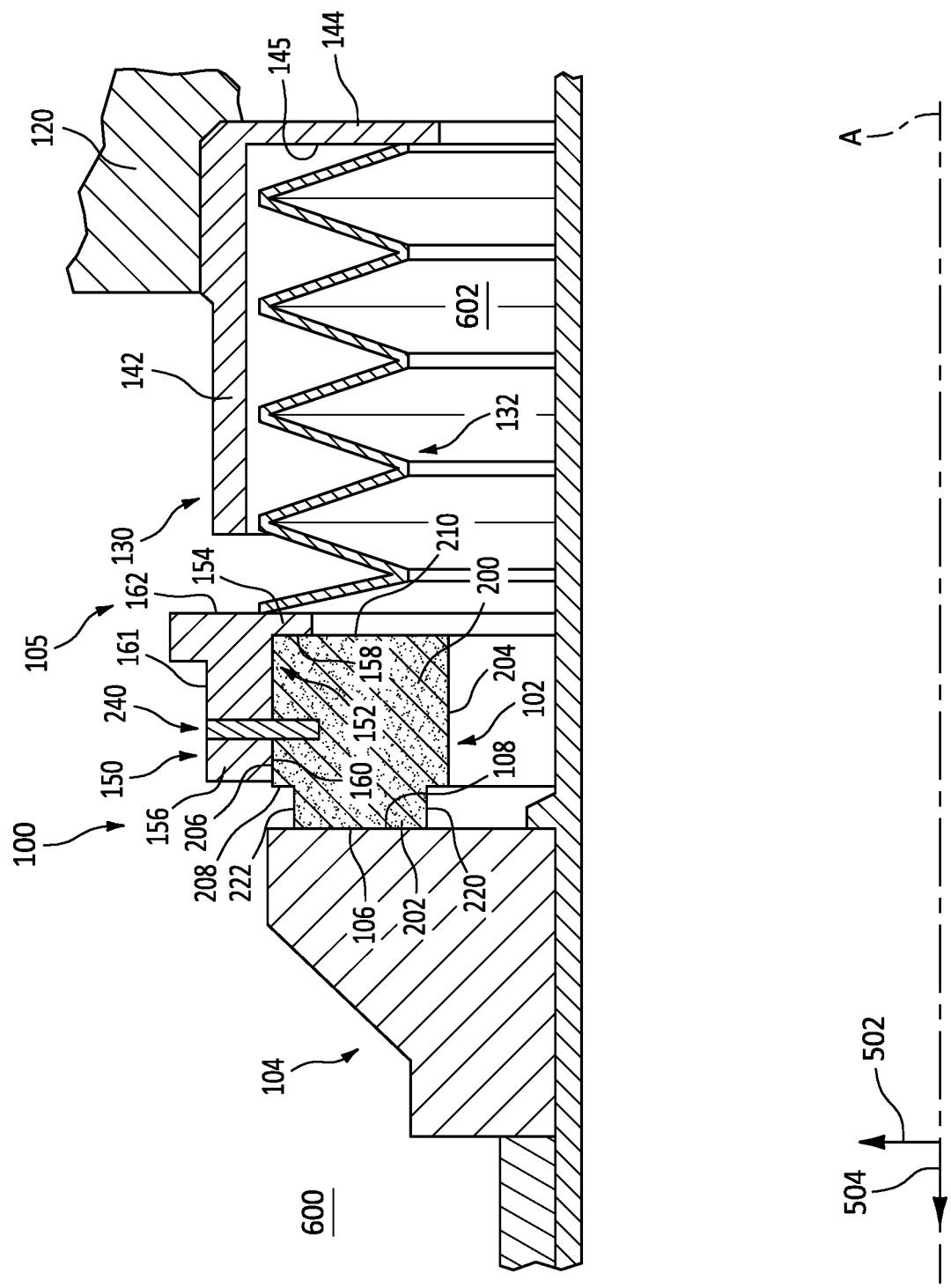
FIG. 1 is a first axial sectional view of a seal system in a turbomachine.

FIG. 1 shows a seal system 100 having a sealing element (seal) 102 and a seat 104 (seal plate). As is discussed further below, the seal system is used in a turbomachine such as a gas turbine engine for a purpose such as isolating a bearing compartment 600. The seal is mounted to a first structure such as an engine static structure and the seat is mounted to rotate relative thereto (e.g., mounted to a shaft) about an axis A which may be the engine centerline or central longitudinal axis. As discussed below, the example seal system includes the seat 104 as one piece and the seal 102 as part of a cartridge subassembly (cartridge) 105. FIG. 1 further shows an outward radial direction 502 and a forward direction 504.

The example seal 102 is a carbon seal (carbon element) having an axially-facing/radially-extending seal surface or face 106. The example seal 102 is formed as single-piece body circumscribing a central axis normally coincident with the centerline A when installed.

The seat 104 has an axially-facing/radially-extending seat surface or face 108 engaging the seal face 106. This engagement may allow relative radial displacement of seal and seat.

The seal system 100 (FIG. 1) isolates a space or volume 600 from a space or volume 602. The example space or volume 600 is a bearing compartment. The example seal system is at an aft end of the bearing compartment. A similar or other seal system (not shown) may be at a forward end of the bearing compartment (e.g., oppositely oriented). The example bearing compartment 600 contains a bearing supporting the shaft for rotation relative to the static structure about the axis A. The example second space or volume 602 is a buffer air chamber.

Figure 10:
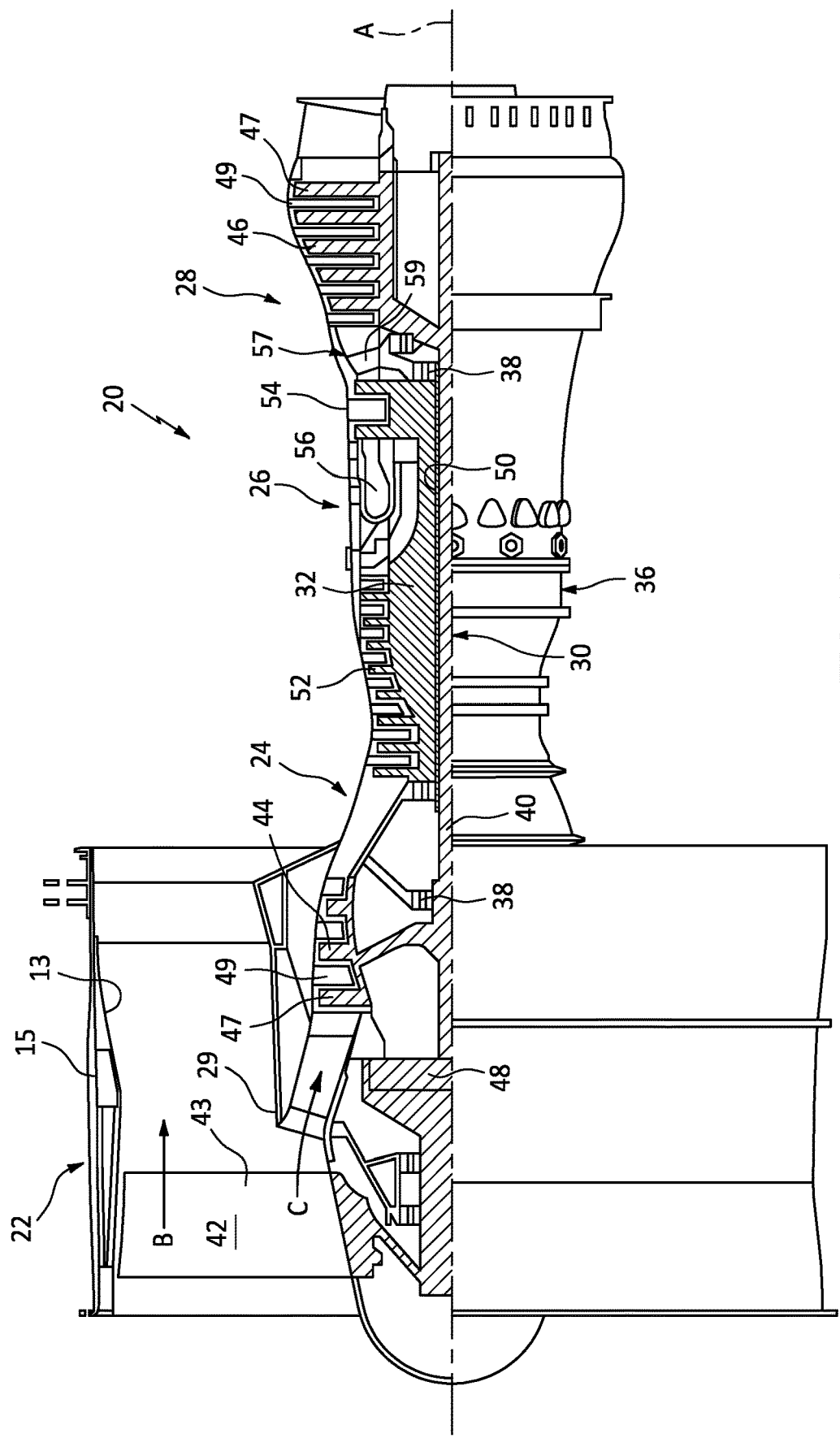
FIG. 10 is a schematic view of a gas turbine engine in which the seal system may be included.

In the example engine configuration and position, a case component 120 (FIG. 1, e.g., a strut ring/frame) of the static structure is positioned radially inboard of a gas path (core flowpath) C (FIG. 10). An example seal system is an oil-cooled dry-face seal system wherein an array of passageways (not shown) extend through the seat from respective inlet ports (not shown) at a plenum (between the seat and a portion of a shaft) through outlet ports (not shown) on the seat to an outer diameter (OD) rim for carrying oil is a dry face uncooled seal system. An alternative is a dry face uncooled seal system. The seal system may alternatively be a wet face seal system in that there are oil passageways to outlets on the seat face 108.

The seal system 100 cartridge 105 further includes a seal housing (seal support) 130 and one or more bias springs 132 (e.g., a bellows spring or an array of coil springs) biasing the seal 102 into engagement with the seat 104 in the assembled engine. The seal housing 130 is mounted to the case component 120 such as via interference fit and/or fasteners (not shown), directly, or indirectly (e.g., via a seal support forming a portion of a larger cartridge assembly). The example seal housing 130 is machined or cast/machined of an alloy. An end wall 144 extends radially inward from the opposite end of the sidewall 142. The adjacent end(s) of the spring(s) 132 contact the interior radial face 145 of the end wall 144. For a bellows spring 132, the spring end may be welded, brazed, or otherwise secured to the face 145. For coil springs (not shown), coil spring ends may be captured in bores in the face 145 or may capture projections from the face 145.

FIG. 1 further shows the cartridge 105 as including a seal carrier (carbon carrier) 150 intervening between the seal 102 and the spring(s) 132. For forming a compartment (seal compartment) 152 for receiving the seal 102, the seal carrier has a radial wall 154 and an axial wall 156 extending axially from the radial wall 154. The radial wall 154 has, along the seal compartment 152, a face 158 (an aft face of the seal compartment and forward face of the wall in the example or a forward face of the seal compartment and aft face of the wall if oppositely oriented). The axial wall 156 has, along the seal compartment, a face 160 (an inner diameter (ID) face). The axial wall 156 has an outer diameter (OD) face 161. The example seal carrier 150 is machined or cast/machined of an alloy. In the example, the radial wall 154 has a face 162 axially opposite the face 158 that also forms an axial end (aft in the example) face of the seal carrier. The example adjacent bellows spring end may be welded, brazed, or otherwise secured to the face 162. In the example embodiment, the bellows spring 132 restricts rotation of the seal carrier 150 about the engine centerline A but also provides a relatively robust centering force. In alternative embodiments, additional anti-rotation and/or centering means may be provided. For example, when using an array of compression coil springs instead of the bellows spring the seal system may need such means. Example such means are one or more anti-rotation pins fixed relative to case structure received in holes in cars and/or a flange of the seal carrier to restrict rotation and limit radial excursions. Additionally, in various implementations, there may be secondary seals including labyrinth seals, C-seals, and the like.

FIG. 1 shows the seal 102 as having a main body section 200 and a nose 202 protruding axially therefrom to the seal surface 106. The main body 200 has an inner diameter (ID) surface 204 and an outer diameter (OD) surface 206. The main body has a first end face 208 (forward in the example) and a second end face 210 (aft in the example). The second end face 210 contacts the face 158. The surface 206 contacts the seal carrier axial wall ID surface 160. The nose 202 has an inner diameter (ID) surface 220 and an outer diameter (OD) surface 222 respectively radially recessed relative to the surfaces 204 and 206.

Figure 1A:
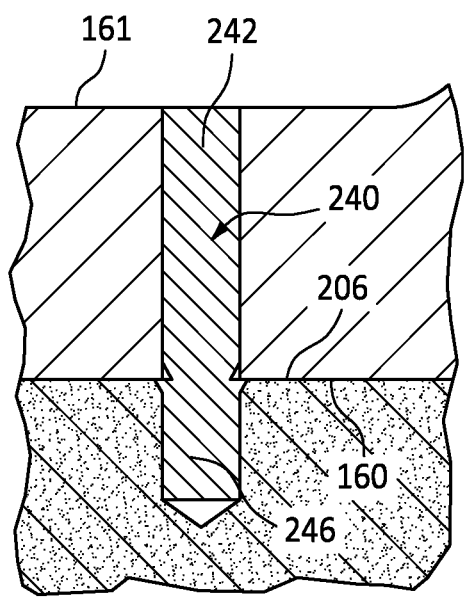
FIG. 1A is an enlarged view of the seal system of FIG. 1.

The example seal system includes a key 240 spanning an interface between the seal 102 and seal carrier 150. The example key 240 (FIG. 1A) spans an interface between the seal OD surface 206 and seal carrier ID surface 160. The example key 240 is formed as a metallic rod (e.g., right circular cylinder potentially modified such as discussed below). An outboard portion 242 of the key is accommodated in a hole 244 in the carrier (e.g., a through hole between the seal carrier ID surface and the OD surface). The key may be in an interference fit (e.g., press fit and/or thermal interference fit) in the hole 244. An inboard portion 246 of the key is accommodated in a hole 248 in the seal (e.g., a blind hole extending radially inward from the seal OD surface 206). The key may be in a non-interference fit or an interference fit (e.g., press fit and/or thermal interference fit) in the seal hole 246.

Figure 2:
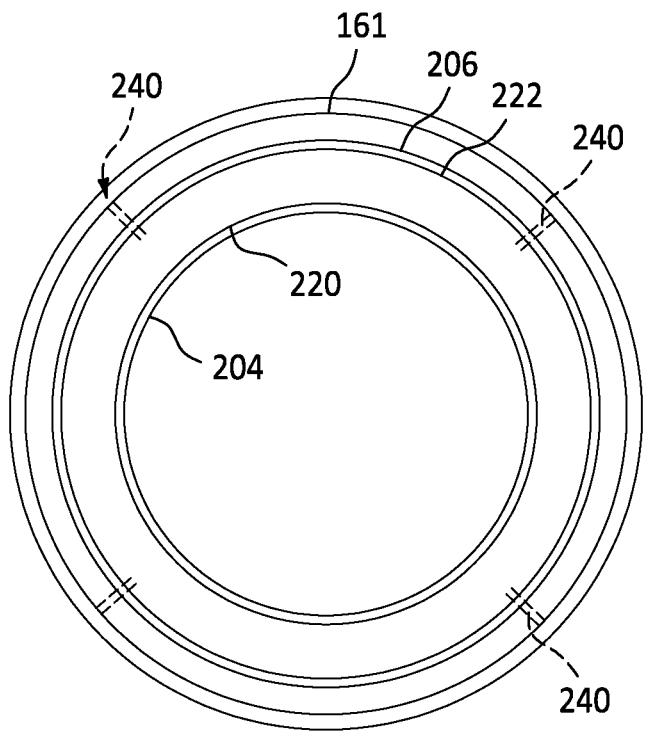
FIG. 2 is an end view of a seal and seal carrier of the seal system of FIG. 1.

FIG. 2 shows a circumferential distribution of such keys 240. The example distribution is an array of four keys at even 90° intervals about the engine/seal system centerline (central longitudinal axis) A. More broadly, an example number is three to twelve.

Figure 3:
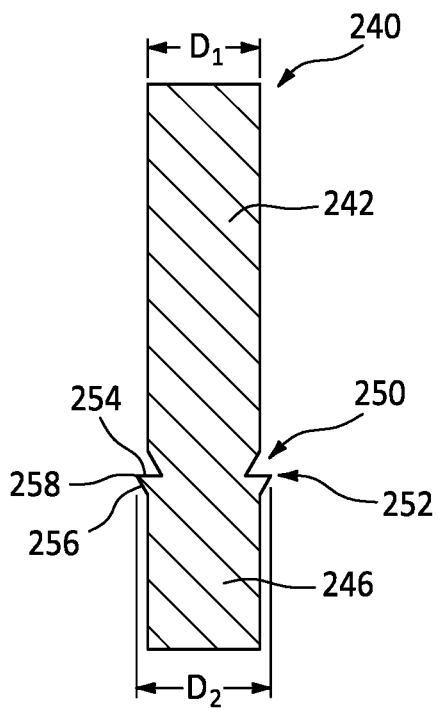
FIG. 3 is an axial sectional view of key.
Figure 4:
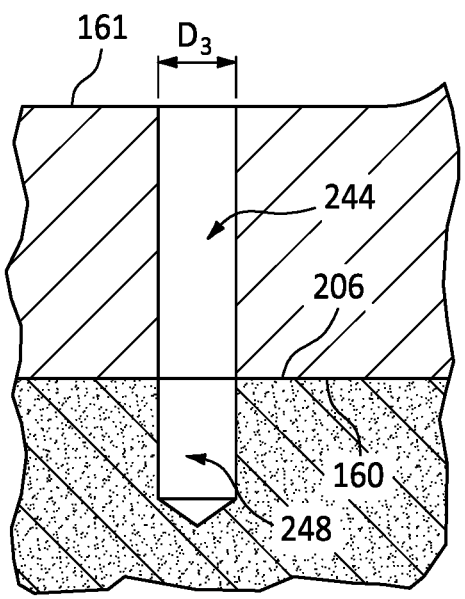
FIG. 4 is an enlarged axial sectional view of key holes in the seal and seal carrier before key installation.

FIG. 3 shows an example key 240 prior to installation. The example key is metallic such as a steel. FIG. 4 shows the holes 244 and 248 prior to key insertion (e.g., having been co-drilled (line drilled) after interference fitting of the seal to the seal carrier). The example key 240 is formed as a pin and has a projection formed as a radially protruding barb 252 at an upper (radially outboard viewed in the engine frame of reference) end of the inboard portion 246. The example key also has a radial recess 250 immediately above at a lower (radially inboard viewed in the engine frame of reference) end of the outboard portion 242. In the example, the recess and barb are co-formed by displacement of material (e.g., from an initially right circular cylindrical rod stock). The barb has a relatively radial outboard surface 254 and a relatively tapering inboard surface 256 meeting at an apex 258. The barb may be made by rolling with a shaped indenter to indent at the recess 250 and raise the barb as if a burr. To facilitate such rolling and elastic deformation in assembly, the pin may be of a mild steel (e.g., AISI/SAE 4340). The pin may thus be softer than the carrier (e.g., a carrier of 17-4PH/AMS 5643 stainless steel).

During installation, the key may be forcibly driven radially inward with the inboard portion 246 first passing through the carrier hole 244 and then into the seal hole 248. While passing through the carrier hole, interference may substantially elastically depress the barb 252 into the recess 250. However, as the barb 252 passes radially inward beyond the ID face 160 and encounters the relatively lower strength and modulus material of the seal, the deformation of the barb will at least partially relieve, causing the barb to radially expand and at least partially relax and the surface 254 to backlock against the carrier ID surface 160 to resist/prevent outward radial displacement of the key.

FIG. 3 shows an example diameter $D_1$ of the key inboard portion and outboard portion away from the recess 250 and barb 252. An example $D_1$ is 1.0 mm to 5.0 mm, more narrowly 2.0 mm to 4.0 mm. An example diameter $D_2$ at the barb 252 is 105% to 150% of $D_1$, more particularly, 110% to 130%. For an interference fit, relaxed hole diameters $D_3$ (FIG. 4—relaxed in as-drilled lacking interference with the pin but reflecting any interference between the seal and carrier) will be in the same range but slightly less than actual $D_1$ in accordance with conventional interference fit engineering practice. Example key length is 300% to 1000% of $D_1$.

Figure 5:
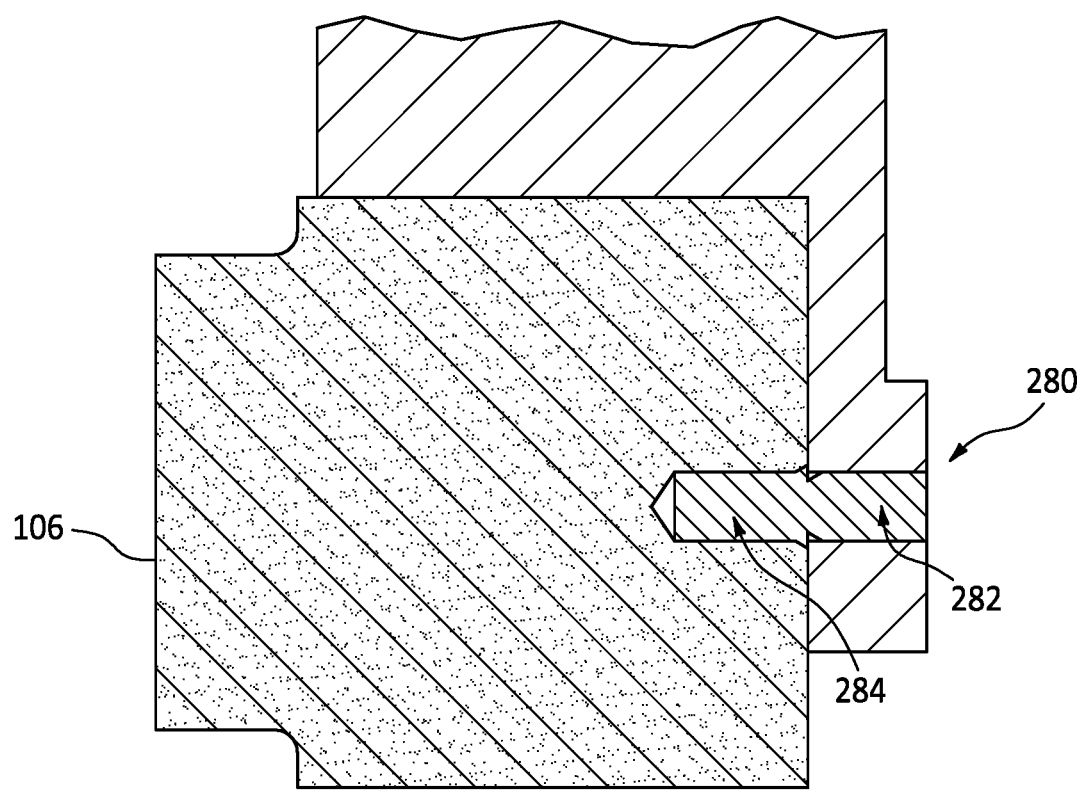
FIG. 5 is an enlarged axial sectional view of a second seal system.

FIG. 5 shows an alternate key 280 which may be identical to the key 240 but oriented axially passing through an axial hole 282 in the carrier radial wall and to a blind hole 284 in the seal. Thus, the barb of the key 280 backlocks against the radial wall face 158. In various examples, the keys 240 and 280 may coexist in the same seal system and may be circumferentially co-aligned or out-of-phase with each other and, in various implementations there may be different numbers of the two types of keys in any seal system.

Figure 6:
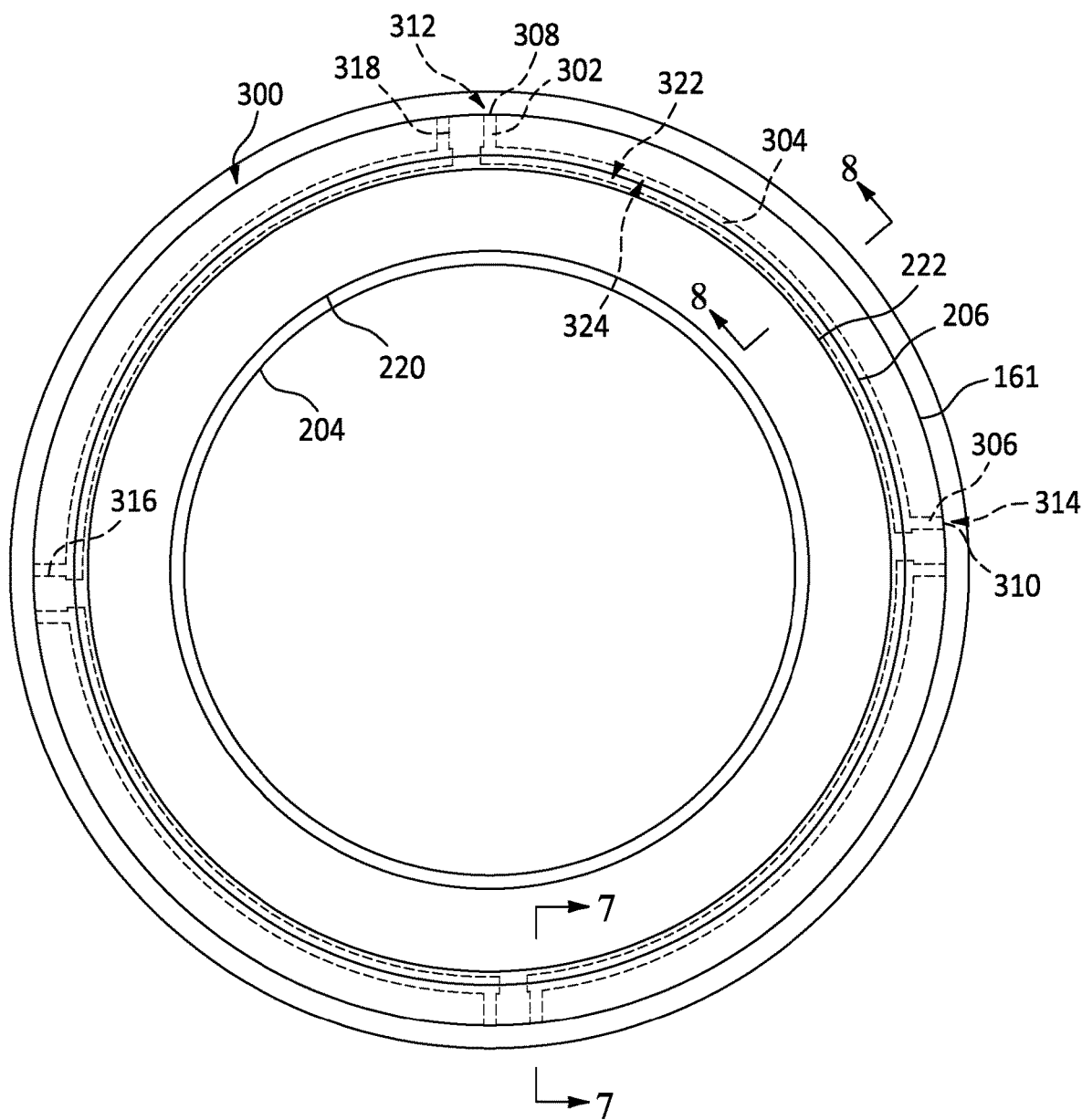
FIG. 6 is an end view of a third seal and seal carrier.
Figure 7:
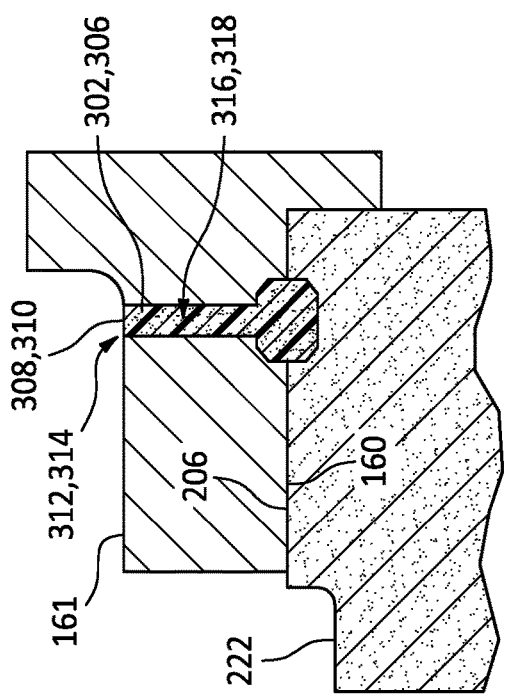
FIG. 7 is a first sectional view of the third seal and seal carrier.

As noted above, alternative keys may be formed in situ. FIG. 6 schematically shows keys 300 formed in situ via injection of a liquid material that ultimately hardens (e.g., epoxy). An example epoxy is a two-part epoxy, and may be a filled or an unfilled epoxy. The example keys have three legs: a first terminal leg 302; a circumferentially extending intermediate leg 304; and a second terminal leg 306. The example terminal legs have ends 308, 310 at openings or ports 312, 314 of the combined seal carrier and seal. In the FIG. 6 illustration, the openings are along the OD surface 161 of the seal carrier (FIG. 7).

The example terminal legs are radially extending in respective radial passageways or holes 316, 318 (e.g., drilled). The intermediate leg 304 is within a circumferential passageway or channel 320 (FIG. 8) spanning the junction or interface between the seal and the carrier. The example passageway 320 is formed by respective open channels or grooves 322 and 324 in the seal OD surface and carrier sidewall ID surface. Each of these channels 322 and 324 extends between respective first and second circumferential ends. In the example, when in nominal circumferential alignment, the ends of the channels may extend circumferentially past the passageways 316, 318 (see FIG. 6) to allow some degree of misalignment while still having full contiguity/communication between the passageways 316, 318. Thus, the initial thermal interference fitting of seal to carrier may provide direct seal to carrier interference contact beyond the channels. For example, in a reengineering from a baseline configuration lacking the channels, such direct contact area may represent a majority (e.g., at least 70% or at least 80%) of the baseline configuration's contact area.

To install the keys 300, after thermal interference fitting of seal to carrier (e.g., at least after sufficient cooling so that the seal will be retained to the carrier during in situ formation), the key material may be injected through one of the ports (e.g., 312) and ultimately pass out the other (e.g., 314). The key may then be allowed to cure. Any excess material may be trimmed at the ports (post-curing/hardening (e.g., cut) and/or pre-curing/hardening (e.g., cut or simply wiped off if sufficiently viscous to avoid undue outflow).

Figure 9:
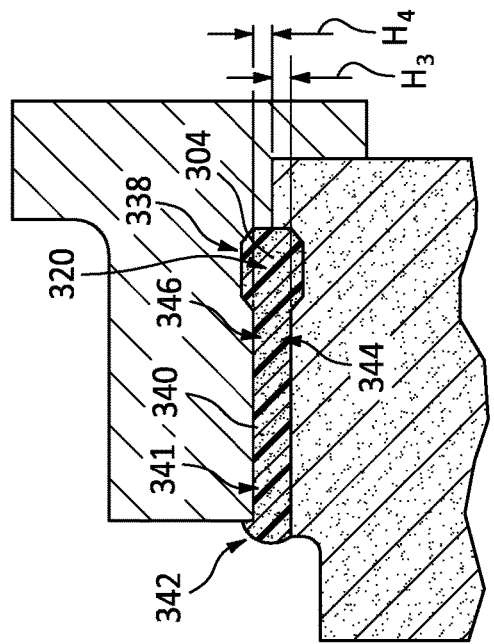
FIG. 9 is a sectional view of a fourth seal and seal carrier.

Other configurations are possible. For example, FIG. 9 shows a key 338 having an axial terminal leg 340 accommodated in an axially extending passageway or channel 341 extending along the interface. For example, the axially extending passageway or channel 341 may be formed by mating channels or grooves 344 and 346 in the seal OD surface and carrier sidewall ID surface, respectively. Thus, the corresponding port 342 may also be at the seal-carrier junction and may face axially. Such axial terminal leg(s) may replace one or both of the radial legs 302, 306. For example, such an axial leg 340 may replace the radial outlet leg of each key. This allows radially inward injection with axial discharge allowing axial observation of all outlets at once to confirm sufficient injection and also allowing curing without any leakage out leaving voids.

Figure 8:
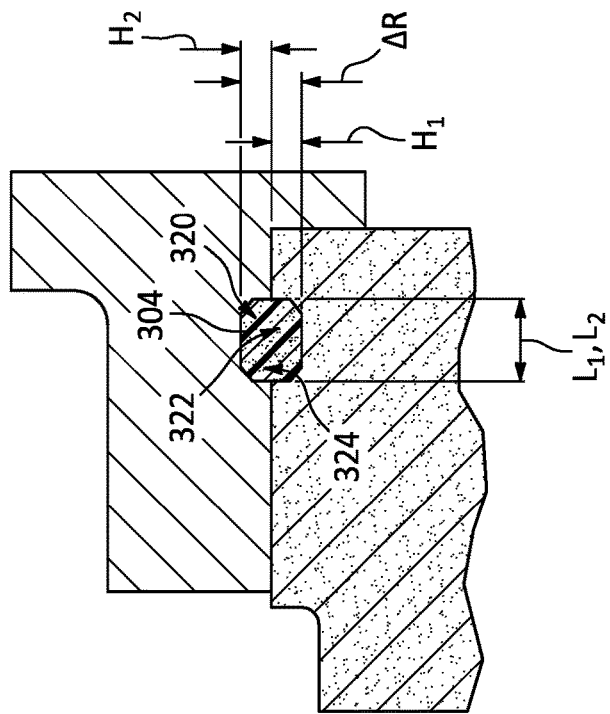
FIG. 8 is a second sectional view of the third seal and seal carrier.

FIG. 8 shows the circumferential passageway 320 and associated contained epoxy 304 as having a radial span ΔR formed by the combination of channel/groove 322 and 324 depth or heights $H_1$ and $H_2$. Example $H_1$ and $H_2$ are 0.10 millimeters to 3.0 millimeters, more particularly, 0.50 millimeters to 2.5 millimeters to provide advantageous flow and subsequent strength.

FIG. 9 shows the leg 340 and the grooves forming the channel 341 as having associated heights $H_3$ and $H_4$ in the seal and carrier, respectively. Example $H_3$ and $H_4$ are about the same as or smaller than $H_1$ and $H_2$ (e.g., 40% to 110%, more particularly, 60% to 100%). Example transverse or circumferential dimensions of the leg 340 and channel 341 may be of a similar magnitude to the radial (e.g., 30% to 300% or 50% to 200% of $H_3$ and $H_4$). Example axial lengths of the leg 340 and channel 341 may be substantially greater (e.g., 200% to 1000% of $H_3$ and $H_4$).

Example end-to-end circumferential spans of the channels or grooves 322 and 324 will depend on the number of keys. For the example four keys, the example is slightly less than 90° (e.g., 80° to 88°). But a broader range is 20° to 88°.

As with the pre-formed keys, there may be additional variations involving the carrier-to-seal interface at the radial wall. These variations may thus provide circumferential retention without significant axial retention (adhesion rather than mechanical keying/interfitting may provide some axial retention).

The example seal systems may represent a modification or reengineering of a baseline seal or configuration thereof (lacking the key). The baseline may have a tight interference fit (e.g., press-fit and/or thermal interference fit) between the carbon seal and the seal carrier. The tight interference fit may itself provide robust sealing between the seal and carrier. The modified or reengineered seal system or configuration may involve a lighter interference fit in some embodiments.

In one example of an assembly process, the seal carrier 150 is preheated (e.g., by thermal convection in either an air oven or a liquid (e.g., water) bath). Example heating in an existing baseline range is to a temperature in the range of 280° C. to 340° C. Example heating for a reduced temperature range for reduced stress is to a temperature of about 120° C., more broadly, 90° C. to 150° C. or 90° C. to 200° C. or 90° C. to 250° C.

The seal 102 may be inserted to the seal carrier via translation (e.g., held by a tool (not shown)). The seal may then be held in its fully seated condition while the carrier is allowed to cool (e.g., in ambient or forced air) to a threshold temperature (e.g., by at least 50% of the peak temperature difference or at least 80%). Thereafter, it may be released from the tool for any further cooling and subsequent assembly to additional components. Depending on configuration, prior to assembling the seal to the seal carrier the seal carrier may be assembled to the bellows spring.

In one example of reengineering from a baseline seal system, an interference fit of the baseline seal is replaced by a lighter interference fit plus the action of the keys. Seal construction may otherwise be preserved. This interference reduction may be achieved by a slight increase in the diameter of the seal carrier ID surface or by a slight decrease in the diameter of the seal OD surface. In some embodiments, the reduced tensile hoop stresses in the carrier enable the use of lower strength carrier materials that may have more favorable characteristics for seal performance such as lower coefficients of thermal expansion that more closely match that of the seal carbon. For example, an iron-nickel alloy such as ASTM F30 (e.g., Alloy 42 or UNS N94100), may replace a steel (e.g., 17-4PH/AMS 5643 stainless steel). Additionally, the lower stresses in the carbon and carrier may enable cross-sectional geometries that may be more favorable to seal performance but would otherwise not have sufficient structural strength to be acceptable.

However, further advantages may be achieved and may have a cumulative effect and any particular embodiment may involve tradeoffs among the possible advantages. For example, the reduced interference fit reduces stresses in the seal. This may allow a reduction in the cross-sectional area of the seal due to not having to withstand the stresses at a given level of interference. This cross-sectional reduction reduces the weight of the seal.

For thermal interference fits, reduced interference may reduce the heating temperature and thus decrease cycle time and energy used in heating. Similarly, reduced interference may be associated with reduced need for robustness of the seal carrier, allowing material removal from the seal carrier and, thereby, lightening of the seal carrier. Lightening of the seal carrier may have positive feedback by further reducing energy and cycle time for heating in the thermal interference fit.

Lightening of the seal and/or seal carrier and/or sealing ring also allows reduction in the needed bias force from the bias spring(s). This reduced bias force may be associated with reduced spring weight. However, the reduced biased force may have a number of other advantages. Reduced bias force will, all things being equal, reduce seal wear and heat generation. This may improve longevity.

As an example of temperature reduction for thermal interference fit, the baseline seal may use a heating temperature in the range of 280° C. to 340° C.; whereas the revised seal may use 90° C. to 150° C. or other ranges discussed above. The reduction may be of an example 190° C. to 220° C. or 100° C. to 220° C.

As an example of interference and stress reduction, the baseline seal may have an example compressive stress (e.g., at ambient conditions of 21° C. and 1.0 atm (1.0 Bar), more broadly 18° C. to 25° C. at 0.95 Bar to 1.05 Bar) of 18,500 psi (128 MPa), more broadly at least 75 MPa or 75 MPa to 150 MPa; whereas the revised seal may have an example such a stress of 5,735 psi (39.5 MPa), more broadly at least 10 MPa or 10 MPa to 60 MPa or 20 MPa to 50 MPa. The reduction may be of an example at least 10 MPa, if present.

Additionally, the reduced interference may allow reduced tolerance requirements.

Component materials and manufacture techniques and assembly techniques may be otherwise conventional. For example, there are numerous commercially available annular carbon seal blanks. Such a stock blank may be lathed to profile and may then have material milled and drilled away to reveal any non-annular features such as the groove segments. These commercial blanks are available in a variety of base carbon materials (e.g., carbon graphite and electrographite) with various impregnants (e.g., for strength/cohesion and/or lubricity) suitable for particular operating environments and conditions. Example material is at least 50% carbon by weight, more particularly, at least 90% or 95% or 99% or even commercially pure carbon with inevitable impurities.

Example seats may be machined from an appropriate metal alloy (e.g., a stainless steel). This may be via lathing of an annular blank to a basic profile and then milling and drilling departures from annular (e.g., mounting splines, ID oil channels, and the like if present).

The housing and seal carrier may be formed of an appropriate metal alloy (e.g., stainless steel or a titanium alloy) and may be formed such as by pure machining/drilling of a blank or by casting and finish machining. There may be a turning to form annular surfaces such as the basic ID surface 160 with subsequent machining of the non-annular features such as grinding or milling of the groove(s), if any and drilling of the hole(s), if any.

FIG. 10 schematically illustrates a gas turbine engine 20 as one of many examples of an engine in which the seal system 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A (forming the axis 500) relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. An apparatus comprising:
   a first member;
   a shaft rotatable relative to the first member about an axis; and
   a seal system comprising:
      a seal carrier having:
         an axially-extending wall having an inner diameter surface; and
         a radially-extending wall having a first surface;
      a seal carried by the seal carrier in a radial interference fit with the seal carrier axially-extending wall inner diameter surface and having:
         an outer diameter surface; and
         a seal face;
      a seat carried by the shaft and having a seat face in sliding sealing engagement with the seal face; and
      one or more springs biasing the seal carrier relative to the first member so as to bias the seal face against the seat face,
   wherein:
      a key spans an interface between the seal carrier and the seal;
      the key has:
         a first portion in a through-hole in the seal carrier axially-extending wall;
         a second portion in a hole in the seal carrier axially-extending wall; and
         a third portion in a circumferentially-extending channel formed by respective grooves in the seal carrier and seal and joining the first portion to the second portion.

2. The apparatus of claim 1 wherein:
   the key spans the seal carrier inner diameter surface and the seal outer diameter surface.

3. The apparatus of claim 2 wherein:
   the radial interference fit provides a compressive stress in the seal of 10 MPa to 150 MPa.

4. The apparatus of claim 1 wherein:
   the key comprises an epoxy.

5. The apparatus of claim 1 wherein:
   the seal is a carbon seal.

6. The apparatus of claim 1 wherein:
   the seal is a single piece.

7. The apparatus of claim 1 being a gas turbine engine.

8. A method for manufacturing the apparatus of claim 1, the method comprising:
   thermal interference fitting the seal to the seal carrier; and
   forming the key in situ.

9. The method of claim 8 comprising said forming the key in situ wherein:
   the forming the key in situ comprises curing epoxy.

10. The method of claim 9 wherein:
    the forming the key in situ is after the thermal interference fitting; and
    the forming the key in situ further comprises injecting the epoxy before the curing.

11. The method of claim 10 wherein:
the injecting the epoxy passes the epoxy through an inlet and an outlet, at least one of the inlet and the outlet being in the seal carrier.

12. The method of claim 11 wherein:
the injecting the epoxy passes the epoxy through an inlet leg from the inlet, an outlet leg to the outlet, and an intermediate leg circumferentially offsetting the outlet leg from the inlet leg.

13. The method of claim 11 wherein:
the injecting the epoxy passes the epoxy through a leg formed by mating grooves in the seal and seal carrier.

14. An apparatus comprising:
a first member;
a shaft rotatable relative to the first member about an axis; and
a seal system comprising:
  a seal carrier having:
    an axially-extending wall having an inner diameter surface; and
    a radially-extending wall having a first surface;
  a seal carried by the seal carrier in a radial interference fit with the seal carrier axially-extending wall surface and having:
    an outer diameter surface; and
    a seal face;
  a seat carried by the shaft and having a seat face in sliding sealing engagement with the seal face; and
  one or more springs biasing the seal carrier relative to the first member so as to bias the seal face against the seat face,
wherein:
a key spans an interface between the seal carrier and the seal; and
the key has:
  a first portion in a through-hole in the seal carrier axially-extending wall;
  a second portion in an axially-extending channel formed by respective grooves in the seal carrier axially-extending wall inner diameter surface and seal outer diameter surface; and
  a third portion in a circumferentially-extending channel formed by respective grooves in the seal carrier and seal and joining the first portion to the second portion.

15. The apparatus of claim 14 wherein:
the key comprises an epoxy.

16. An apparatus comprising:
a first member;
a shaft rotatable relative to the first member about an axis; and
a seal system comprising:
  a seal carrier having:
    an axially-extending wall having an inner diameter surface; and
    a radially-extending wall having a first surface;
  a seal carried by the seal carrier in a radial interference fit with the seal carrier axially-extending wall inner diameter surface and having:
    an outer diameter surface; and
    a seal face;
  a seat carried by the shaft and having a seat face in sliding sealing engagement with the seal face; and
  one or more springs biasing the seal carrier relative to the first member so as to bias the seal face against the seat face,
wherein:
a key spans an interface between the seal carrier and the seal;
the key comprises a metallic pin;
the metallic pin has a shaft having:
  an outboard portion in a through-hole in the seal carrier;
  an inboard portion in a hole in the seal; and
  a lateral protrusion backlocked against the seal carrier to resist outward displacement.

17. The apparatus of claim 16 wherein:
the seal is a carbon seal.

18. The apparatus of claim 16 wherein:
the seal is a single piece.

19. The apparatus of claim 16 being a gas turbine engine.

20. A method for manufacturing the apparatus of claim 16, the method comprising:
thermal interference fitting the seal to the seal carrier; and
installing the key.

21. The method of claim 20 comprising said installing the key wherein:
the installing the key comprises driving the key through the seal carrier into the seal; and
the driving the key through the seal carrier compresses the lateral protrusion and then allows the lateral protrusion to expand to backlock against the seal carrier to resist outward displacement.

* * * * *